United States Patent [19]

Porel

[11] Patent Number: 5,018,753
[45] Date of Patent: May 28, 1991

[54] COMPOSITIONS FOR HYDRAULIC JOINT

[75] Inventor: Louis C. Porel, Rambervillers, France

[73] Assignee: Hydro Rene Luc, Baccarat, France

[21] Appl. No.: 365,941

[22] Filed: Jun. 14, 1989

[30] Foreign Application Priority Data

Jun. 14, 1988 [FR] France .................................. 88 07939

[51] Int. Cl.⁵ .......................... F16J 9/06; F16J 15/16
[52] U.S. Cl. .................................... 277/165; 277/136; 277/159; 277/173
[58] Field of Search ............... 277/165, 168, 173, 176, 277/177, 198, 199, 178, 108, 187, 136, 159

[56] References Cited

U.S. PATENT DOCUMENTS

| | | | |
|---|---|---|---|
| 3,149,848 | 9/1964 | Galloway | 277/165 |
| 3,285,614 | 11/1966 | McClenathan | 277/136 |
| 3,386,746 | 6/1961 | Liebig | 277/199 |
| 3,636,824 | 1/1972 | Clark | 277/165 |
| 3,663,024 | 5/1972 | Traub | 277/165 |
| 4,856,794 | 8/1989 | Boyers et al. | 277/136 |

FOREIGN PATENT DOCUMENTS 756460  9/1956  United Kingdom ................ 277/165

Primary Examiner—Allan N. Shoap
Assistant Examiner—Daniel G. DePumpo
Attorney, Agent, or Firm—Darby & Darby

[57] ABSTRACT

Sealing joint for parts of hydraulic equipments in rotating relative motion, of the type consisting of the combination of a friction ring (2) of hard material having good friction resistance characteristics and of a ring (1) of flexible material, the two rings (1, 2) being anchored to one another by means of holes made in the face of the ring (2) of hard material in contact with the flexible material (1), characterized by the fact that the holes consist of blind grooves (8) parallel to the axis of rotation, and that the ring of flexible material (1) has, integrally formed, ribs (7) having practically the same width and the same height as the grooves (8), but a shorter length (V).

3 Claims, 1 Drawing Sheet

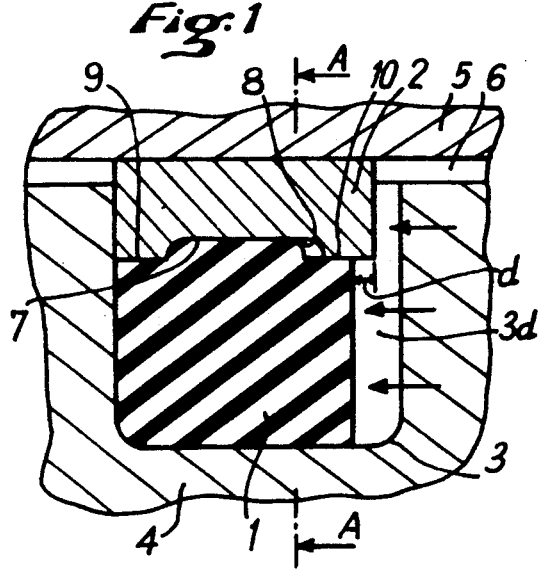
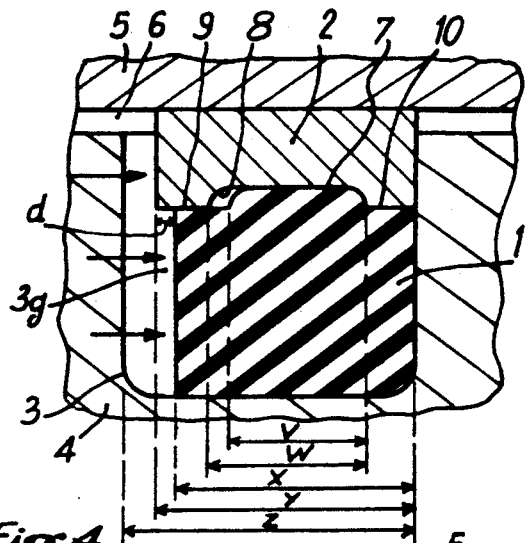
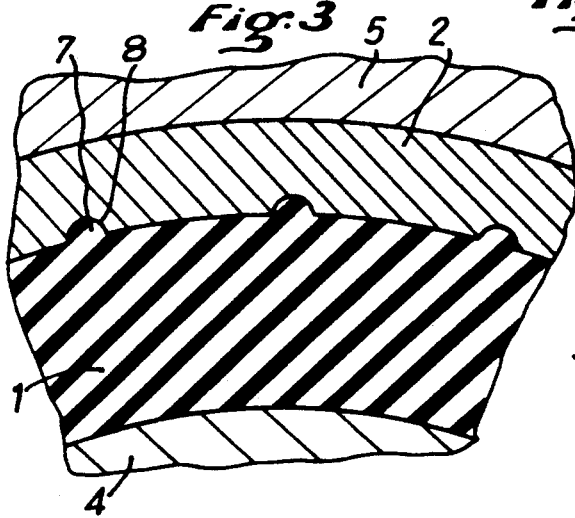
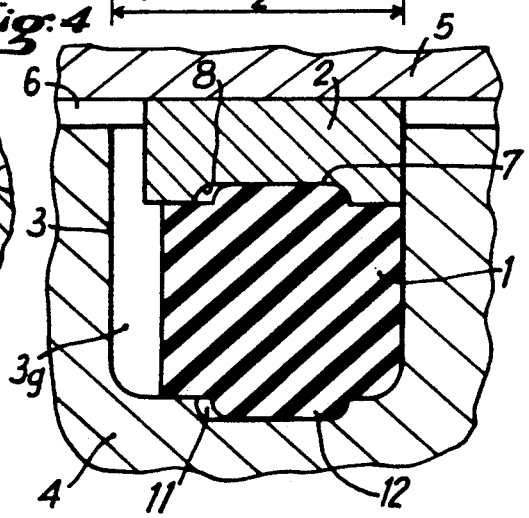
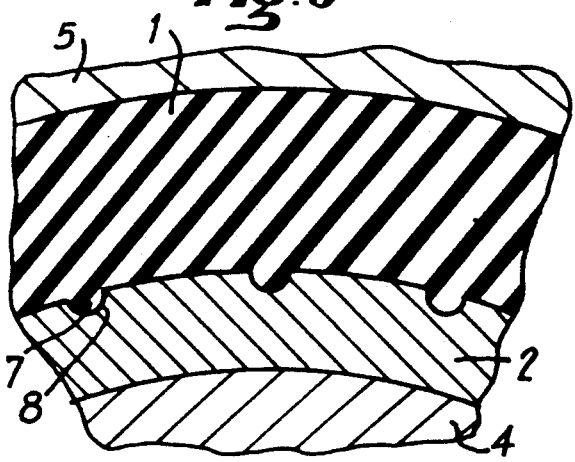
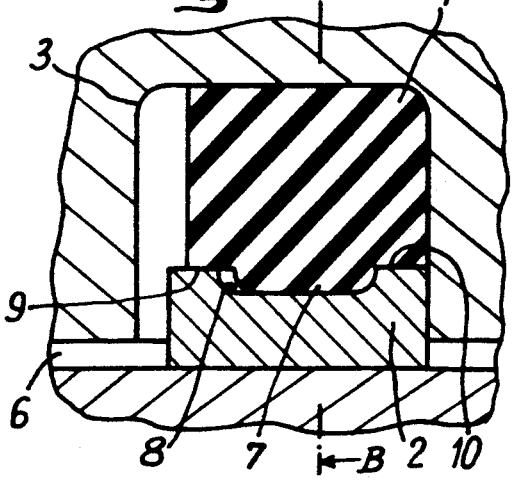

COMPOSITIONS FOR HYDRAULIC JOINT

The present invention relates to composite joints for hydraulic systems.

In French patent No. 1,049,256 of Jan. 18, 1951, in the name of Mr. Rene Leduc, a composite joint was described consisting of the assembly, one on the other, of a ring of hard material, having good friction qualities, and of a ring of elastic material, the latter becoming deformed under the action of the hydraulic pressure and strongly applying the ring of hard material against the surface on which it rubs.

In U.S. Pat. No. 2,138,311 of May 24, 1971, in in the name of the company Rene Leduc et Fils, an improvement intended to prevent any sliding of one of the rings relative to the other was described. This improvement consists in arranging in the face of the ring of hard material, which is in contact with the ring of elastic material, a plurality of small hole ("alveoles"), so that, under the action of the hydraulic pressure, the elastic material flows (creeps) into the holes, thereby anchoring this elastic material in the hard material.

In Certificate of Addition No. 2,538,871, two improvements were described: one by which the friction ring of hard material is provided with peripheral gorges (throats) on both its faces; and a second improvement by which the ring of hard material is pierced with orifices traversing it from side to side, in such a way that the end of each orifice in contact with the metal piece retains hydraulic liquid, its other end serving as anchoring hole for the soft and flexible material.

It has been found in use that for the parts in relative motion of rotation the first arrangement was not an improvement, quite the contrary, because the peripheral gorges permit the two rings to slide in rotation relative to one another. On the other hand, the second arrangement gives better anchoring than that of the holes according to U.S. Pat. No. 2,138,311, for it may happen that these holes are not deep enough or that they have flanks that are too open.

However, all these techniques make use of an anchoring by bending a soft material in recesses made in a hard material, and it may happen, therefore, that poor anchoring is obtained when the creep of the ductile material is insufficient. This may occur when the pressure is insufficient and/or when the softer material is not ductile enough.

The object of the present invention are means permitting to obtain a positive anchoring in rotation even in the absence of any pressure and even if the rubber used is not very ductile while yet being able to withstand readily hydraulic pressures of the order of from 700 to 800 bars.

The present invention concerns a sealing joint for parts of hydraulic equipments in relative rotating motion, of the constituted by the combination of a friction ring of hard material having good characteristics of resistance to friction and a ring of more flexible material, both rings being anchored to each other by means of holes cut into the face of the ring of hard material in contact with the more flexible material, characterized by the fact that said holes consist of blind grooves parallel to the axis of rotation of the parts, and that the ring of more flexible material has, molded on, ribs having practically the same width and the same height as the grooves but a shorter length, said ribs fitting into said grooves to interlock the two rings in rotation.

The present invention also includes the following arrangements: 1. There may be provided similar grooves in the bottom of the gorge receiving the ring of more flexible material and ribs on the face of the ring in contact with the gorge bottom. 2. On either side of the ribs and of the grooves, flat and smooth sealing zones are provided to prevent the hydraulic liquid from penetrating into the grooves.

By way of non-limiting examples and to illustrate the invention, the annexed drawings show:

FIGS. 1 and 2, two schematic sectional views on a large scale of a male joint according to the invention subjected to the high pressure on the right side (FIG. 1) and on the left side (FIG. 2);

FIG. 3, a partial sectional view along AA of FIG. 1;

FIG. 4, a view of a variant of FIG. 2;

FIG. 5, a schematic sectional view of a female joint, according to the invention;

FIG. 6, a partial sectional view along BB of FIG. 5.

FIGS. 1 to 4 represent a male joint. This joint consists of the superposition of an inner ring 1, of relatively flexible material, such as rubber, and of an outer ring 2 of a hard material having good friction qualities, as for example nylon or teflon.

The composite joint 1-2 is placed in a circular gorge 3 hollowed out in a part 4. The outer face of ring 2 rubs against the wall of a part 5. The parts 4 and 5 are in relative motion of rotation about an axis.

The hydraulic liquid pressure arrives through the small interstice 6 existing between the parts 4 and 5 and penetrates into the gorge 3. The pressure of the hydraulic liquid flattens the material of ring 1, and this strongly applies ring 2 against the wall of part 5.

However, as will be understood on comparatively examining FIGS. 1 and 2, the hydraulic pressure does not flatten, or practically does not flatten the material of ring 2. As a result, practically the entire mass of ring 1 becomes displaced transversely relative to ring 2. In FIG. 1, the pressure acts on the right side of the composite joint, in the volume 3$d$; The left wall of ring 1 is "in correspondence with " (opposite) the left wall of ring 2, these two walls being applied against the left wall of gorge 3; on the other hand, the right wall of ring 1 is offset by a distance "d" relative to the right wall of ring 2, this distance "d" varying with the magnitude of the hydraulic pressure applied at 3$d$.

FIG. 2 illustrates the relative positions of the parts when the pressure acts on the left side of the composite joint, in the volume 3$g$. In this case, it is the right walls of the rings 1 and 2 that are applied against the right wall of gorge 3 and are therefore aligned, while their left walls are offset.

To assure a good interlock between the rings 1 and 2 in the transverse direction (which corresponds to a rotation of parts 4 and 5 relative to each other), without it being necessary that this interlock depends on the creep properties of the material of which ring 1 is made, ring 1 is produced by molding providing it with ribs 7 and in the face in contact with ring 2 grooves 8 are made. The ribs 7 and grooves 8 are parallel to the axis of rotation of the parts and they are disposed so that the ribs 7 fit into the grooves 8. To permit the displacements to the left or to the right of the ribs 7 in the grooves 8, the length V of the ribs 7 is less than the length W of the grooves 8.

As can be seen in FIG. 3, the grooves 8 and the ribs 7 are provided to have a limited circumferential dimension but such that the ribs 7 are easy both to manufacture by molding and to position.

On the other hand, as is shown in FIGS. 1 and 2, the grooves 8 must not discharge into the gorge 3, on either side, because the hydraulic liquid present at 3d or 3g must be prevented from penetrating into the grooves 8 as this might cause a separation of the two rings. On either side of the ribs 7 and of the grooves 8, therefore, one provides sealing zones 9, 10 where the surfaces in contact with the two rings are smooth, so as to be intimately applied against one another without it being possible for the hydraulic liquid to intrude therein.

FIG. 4 represents a variant of realization consisting in providing in the bottom of gorge 3, grooves 11 intended to receive corresponding ribs 12 integrally formed in the face of ring 1. For the same reasons as indicated above, the length of the ribs is shorter than those of the grooves when ring 1 shifts laterally due to a change of the side from which the pressure is applied. Sealing zones similar to zones 9 and 10 are provided on either side of the ribs 11 and grooves 12.

FIGS. 5 and 6 represent the same arrangements but reversed for female joints.

I claim:

1. A sealing joint for first and second parts of hydraulic equipment said parts being for rotative relative motion about an axis, said joint for attachment on said first part comprising a combination of a friction ring of hard material having good friction resistance characteristics for making sliding contact with said second part, and a ring of more flexible material, the two rings being concentric with said axis and connected to one another by means of grooves made in a surface of said ring of hard material, said surface being in contact with the ring of more flexible material, said grooves being blind and formed parallel in length to said axis of rotation, the ring of more flexible material having integrally formed ribs parallel to said axis, said ribs having a circumferential width and radial height relative to said axis substantially the same as the circumferential width and radial depth of said grooves, said ribs having a length shorter than the length of said grooves, said ribs fitting into said grooves to interlock the two rings, said shorter rib length enabling longitudinal motion of said ribs in said grooves.

2. A sealing joint as in claim 1, wherien said ring of flexible material is positioned in a gorge of said first part, the bottom of said gorge having blind grooves extending parallel to said axis, said ring of flexible material further including a surface in contact with the bottom of said gorge, said bottom contacting surface having bottom ribs integrally formed and extending parallel to said axis, said bottom ribs having a circumferential width and a radial height relative to said axis substantially the same as said grooves in said gorge, said bottom ribs having a length shorter than the length of said gorge grooves, said bottom ribs fitting into said gorge grooves to interlock said ring of flexible material and said first part, said shorter length of said bottom ribs enabling translation lengthwise of said bottom ribs in said gorge grooves.

3. A sealing joint as in claims 1 or 2, and further comprising flat and smooth sealing zones formed on both sides of said ribs and said grooves, said sealing zones at the sides of said ribs being subject to sliding on said sealing zones at the sides of said grooves when said ribs translate in said grooves, hydraulic liquid being unable to penetrate the interface between said sealing zones.

* * * * *